United States Patent Office 3,782,984
Patented Jan. 1, 1974

3,782,984
ADJUVANTS FOR CEMENTS, MORTARS
AND CONCRETES
Pierre Allemand, Lyon, and Christian Hovasse, Decines, France, assignors to Rhone-Progil, Paris, France
No Drawing. Filed June 28, 1972, Ser. No. 267,230
Claims priority, application France, July 2, 1971, 7125116
Int. Cl. C04b 7/02
U.S. Cl. 106—90    8 Claims

ABSTRACT OF THE DISCLOSURE

Incorporation of a composition comprised of alkali metal acid carbonates, alkali metal salts of hydroxylated organic acids, and alkali metal silicates into portland type cement, and mortars and concretes, etc., containing such cements affords products having an accelerated setting time and which evidence significantly improved mechanical performance and handling characteristics.

BACKGROUND OF THE INVENTION

The present invention relates to a new composition which when incorporated into portland cements and other cements having a high content of tricalcium silicate accelerates the setting and hardening of same and to improved mortars and concretes containing the foregoing type of cement and adjuvant composition of this invention.

Portland cements and other cements having a high content of tricalcium silicate are typically slow setting cements, but, generally, have satisfactory final mechanical strengths. However, in order to meet the requirements of the building and construction industries, it is frequently necessary to use hydraulic binders which have both a quick setting time and a high level of mechanical performance over an extended period of time.

Several products have heretofore been proposed as additives for such cements in order to improve the characteristics of same to meet the foregoing requirements. For example, chlorides, sulphates and nitrates have been suggested and perform satisfactorily, but their use often gives rise to corrosion of metal reinforcements in concretes in which such additives are incorporated.

Similarly, it has been proposed to employ other products which accelerate portland cement setting, but these have only negligibly affected the hardening rates and such cement products have tended to cause immediate stiffness when used in fresh mortars and concretes. Consequently, alkali metal silicates which belong to the latter class of additives have only been used in cast or bedding mortars in the amount of at least 5% by weight with regard to cement.

Moreover, it is known that acid carbonate ion, $HCO_3^-$, accelerates the setting of cement derived from caustic magnesia (French Pat. No. 1,243,946, filed Sept. 11, 1959) or aluminous cements (French Pat. No. 1,377,203, filed Sept. 17, 1963).

It is also known in the prior art that various hydroxylated organic acids and their bases act as setting retardants and fluidizing agents in portland cement.

Thus, hitherto known additive agents for portland cement were characteristically either corrosive, incapable of accelerating cement setting or satisfactorily increasing the mechanical characteristics of such cement after a period of about 24 hours, or producing binders which compared favorably with additive-free cements with respect to overall performance, without adversely affecting the handling characteristics of mortars and concretes derived from such cements. Therefore, a need still exists for a composition and a process for improving portland type cements and products derived from such cement.

SUMMARY OF THE INVENTION

It is, therefore, a primary object of this invention to provide a composition for incorporation into portland cement and other cements having a high content of tricalcium silicate which composition avoids the disadvantages of prior art additive agents in such cements and concretes, mortars, and the like derived from same.

Still another object of the present invention is to provide a process for the preparation of portland type cements and mortars and concretes derived from such cements which process comprises adding a ternary adjuvant composition to the cement to yield cement containing products having accelerated setting and hardening characteristics as well as increased mechanical performance over extended periods of time while at the same time retaining excellent handling characteristics.

Other objects, features and advantages of this invention will become more apparent to those skilled in the art from the detailed description of the invention which follows.

DETAILED DESCRIPTION OF THE INVENTION

In accordance with this invention, it has now been unexpectedly found that portland type cements containing a high content of tricalcium silicate and mortars, concretes and the like derived from such cement are significantly improved by incorporating into such cements a composition comprised by weight with respect to cement, of about 0.5% to 5% of alkali metal acid carbonate, about 0.05% to 2% of hydroxylated organic acids in the form of the alkali metal salts thereof, and about 0.5% to 5% of alkali metal silicates having a molar ratio of $SiO_2/M_2O$ between about 0.5 and 4, preferably 0.8 and 2, wherein M is an alkali metal.

The introduction of the composition of the present invention into portland type cements accelerates the setting thereof and increases the mechanical performance of such cements by between about 50% to 120% measured after about 24 hours and further accomplishes the foregoing wtihout materially decreasing the long-term characteristics of the products. Moreover, the handling qualities of cements containing the instant composition compare quite favorably with cements without additives and, therefore, are extremely well suited for use in all contemplated applications, and are especially advantageous in mass concrete casting.

The superior results obtained utilizing the additive composition of the present invention are wholly unexpected in view of the prior art. As detailed hereinabove, each of the components of the present composition has been heretofore used as the sole additive in portland type cements, but none of the products obtained with just one of the three components of the present composition approaches the level of performance attained with products containing the three component composition of the instant invention.

Thus, tests have shown that the use of alkali metal acid carbonates in amounts from 0.5% to 5% by weight with respect to portland cement, accelerates the setting of same to such an extent that grouts, mortars, or concretes containing these cements are almost instantaneously stiffened making their application extremely difficult. Moreover, the mechanical performance of the aforesaid materials significantly declines after about 24 hours.

Likewise, it has been observed that the addition of a binary composition consisting of an alkali metal acid carbonate in the above proportions and a hydroxylated organic acid as the alkali metal salt in amounts from 0.5% to 2.5% by weight with respect to cement appreciably delays setting and also tends to fluidize the mixture thereby maintaining the desired ease of handling. While the extreme accelerating action observed with acid carbonates alone is obviated by the use of the aforesaid binary mixture, the setting time of the cement closely approximates that of cements without any additives and further the mechanical performance of such mixures are decreased by about 25% to 30% for a 24 hour test period.

From the foregoing it is apparent that the qualities afforded the cement by the introduction of the ternary composition of the present invention were not foreseeable from a knowledge of the action of the separate components. Inasmuch as the introduction into the cement of a binary mixture of alkali metal silicate and a hydroxylated organic acid as the alkali metal salt thereof also delays the setting time and decreases the mechanical performance of the product by about 25 to 30% after 24 hours, it, therefore, appears that the combination of all three components of the composition in certain relative proportions according to the present invention is necessary in order to obtain the desired characteristics.

The present invention is applicable to portland cement or other cements having a high content in tricalcium silicate and, generally, may be a cement in which the clinker added to gypsum represents at least about 80% of the total weight. Of course, other materials, such as fly ash from steam generating stations, pozzolana, slag from blast furnaces or mixtures of these may be present in the cement utilized, but are usually limited to about 20% by weight with respect to the total composition.

When cements prepared according to the present invention are used for making concretes, mortars and the like, the nature, quantity and granulometry of the aggregates employed may vary considerably and all conventional mixtures may be utilized in practicing the instant invention.

The composition according to this invention is employed in the form of a powdered mixture of the alkali metal acid carbonate, alkali metal silicate, and hydroxylated organic acid salts the mixture having a fine granulometry, preferably less than 160 microns and usually introduced into the cement during or after grinding of the cement. Alternatively, it is also possible to disperse the composition of the instant invention in cement and aggregates prior to the mixing thereof or only with cement when the cement is to be used in the preparation of grout or the composition may be introduced into mixing water prior to its utilization. In the latter case where the composition is introduced in mixing water, it is advantageous to admix the composition with a dessicant, such as precipitated silica, which dessicant agent does not alter the characteristics of the cement in the amount utilized and functions to prevent the retention of moisture by the composition of this invention.

The alkali metal acid carbonate component of the composition may be sodium, potassium or lithium acid carbonate and same is utilized in the amount of about 0.5% to 5% by weight with respect to cement.

The silicate component is an alkali metal silicate and may be a sodium or potassium silicate having a molar ratio of $SiO_2/M_2O$ between about 0.5 and 4, preferably 0.8 and 2, M being sodium or potassium. The silicate component is usually present in the amount of about 0.5 to 5% by weight with respect to cement.

The hydroxylated organic salt is an alkali metal salt of tartaric or gluconic acid, preferably, but the alkali metal salts of citric, lactic, malic, or salicylic acid may also be used. The foregoing component is present in the amount of about 0.05% to 2% by weight of cement.

In order to further illustrate the present invention and the advantages thereof, the following specific examples are given, it being understood that same are intended merely as illustrative and in no wise limitative. In the examples hereinafter, the composition of the present invention was introduced into mortars containing portland cement, each mortar comprised of the following:

(In the following, used standards are French standards which can be easily identified thanks to "Catalogue des Normes Françaises" the editor of which is "Association Française de Normalisation.")

| | Grams |
|---|---|
| Sand NF. P 15.403 | 1,350 |
| Artificial portland cement or similar | 450 |
| Water | 225 |

The mortars were prepared according to the standard NF. P 15.403 and the composition of this invention was mixed with mixing water prior to addition to the mortar.

In the tables hereinafter, mortar handling is expressed as the ratio of the spreading coefficients of the mortar containing the composition and that of a blank mortar. The spreading coefficient was measured using a tronconic volume of mortar which was submitted to compression by means of 15 successive shakings (flow test method), and is expressed as the difference in centimeters between spread mortar diameter and that of the cone trunk base which was 8 centimeters.

Mortar setting time was measured by means of a Vicat needle according to the standard NF. P 15.431 at 20° C. in a medium saturated with moisture.

Compression strength was measured on prismatic test tubes (4 x 4 x 16 cm.) according to the standard NF. P 15.401.

Blanks utilized for purposes of comparison and for preparing mortars containing the composition of this invention were prepared as follows.

Blank A: Mortar NF. P 15.403 with CPAC 325 (artificial portland cement+fly ashes from steam generating station).

Blank B: Mortar NF. P 15.403 with CPAL 325 (artificial portland cement+blast furnace slag).

Blank C: Mortar NF. P 15.403 with CPA 325 (artificial portland cement).

In the compositions of the following examples, all percentages are by weight with respect to cement.

EXAMPLE 1
(1) Blank A
(2) 2% of sodium silicate crystallized with 5 water molecules having a molar ratio $SiO_2/Na_2O=1$
(3) 2% of sodium acid carbonate
(4) 0.1% of sodium and potassium double tartrate

EXAMPLE 2
(1) Blank A
(2) 2% of sodium silicate crystallized with 5 water molecules having a molar ratio $SiO_2/Na_2O=1$
(3) 2% of sodium acid carbonate
(4) 0.06% of sodium gluconate

EXAMPLE 3
(1) Blank B
(2) 2% of sodium silicate crystallized with 5 water molecules having a molar ratio $SiO_2/Na_2O=1$
(3) 2% of sodium acid carbonate
(4) 0.1% of potassium and sodium double tartrate

EXAMPLE 4
(1) Blank B
(2) 2% of sodium silicate crystallized with 5 water molecules having a molar ratio $SiO_2/Na_2O=1$
(3) 2% of sodium acid carbonate
(4) 0.06% of sodium gluconate

EXAMPLE 5
(1) Blank C
(2) 2% of sodium silicate crystallized with 5 water molecules having a molar ratio $SiO_2/Na_2O=1$ (3) 2% of sodium acid carbonate
(4) 1% of sodium citrate

EXAMPLE 6
(1) Blank C
(2) 2% of sodium silicate crystallized with 5 water molecules having a molar ratio $SiO_2/Na_2O = 1$
(3) 2% of sodium acid carbonate
(4) 2% of sodium lactate

EXAMPLE 7
(1) Blank C
(2) 2% of sodium silicate crystallized with 5 water molecules having a molar ratio $SiO_2/Na_2O = 1$
(3) 2% of sodium acid carbonate
(4) 0.5% of sodium salicylate The results obtained utilizing the mixture in the preceding examples and the blanks prepared are given in Tables 1 and 2 hereinafter.

TABLE 1

|  | Blank A, CPAC | Example 1 | Example 2 | Blank B, CPAL | Example 3 | Example 4 |
|---|---|---|---|---|---|---|
| Handling | 1 | ≥1 | ≥1 | 1 | ≥1 | ≥1. |
| Onset of setting | 4 hrs. 30 mins | 1 hr. 30 mins | 2 hrs. 40 min | 4 hrs. 50 mins | 1 hr. 45 mins | 3 hours. |
| Setting completed | 4 hrs. 45 mins | 2 hrs. 45 mins | 4 hours | 6 hrs. 20 mins | 3 hours | 4 hrs. 30 mins. |
| Compression strength (in kg./cm.³): |  |  |  |  |  |  |
| 1 day | 96 | 197 | 210 | 63 | 95 | 110. |
| 3 days | 259 | 284 | 295 | 187 | 205 | 220. |
| 7 days | 321 | 325 | 336 | 292 | 315 | 330. |
| 28 days | 382 | 410 | 437 | 406 | 444 | 465. |
| 90 days | 455 | 440 | 455 | 467 | 460 | 475. |

TABLE 2

|  | Blank C, CPA | Example 5 | Example 6 | Example 7 |
|---|---|---|---|---|
| Handling | 1 | 1.05 | 0.90 | 0.94. |
| Onset of setting | 4 hrs. 45 mins | 2 hours | 1 hr. 10 mins | 1 hr. 25 mins. |
| Setting completed | 6 hours | 4 hrs. 30 mins | 1 hr. 30 mins | 1 hr. 45 mins. |
| Compression strength (in kg./cm.³): |  |  |  |  |
| 1 day | 89.5 | 150 | 135 | 140. |
| 3 days | 264 | 280 | 263 | 272. |
| 7 days | 309 | 306 | 295 | 301. |
| 28 days | 463 | 455 | 399 | 415. |

Thus, there is provided by the present invention a ternary composition comprised by weight with respect to cement, of about 0.5% to 5% of alkali metal acid carbonate, about 0.05% to 2% of hydroxylated organic acid alkali metal salt and about 0.5% to 5% of alkali metal silicate which composition when incorporated into portland cement and analogous cements yields a product having excellent handling characteristics, accelerated setting and hardening, and increased mechanical performance after 24 hours without adversely affecting the long-term performance of such cements.

The composition according to the present invention may be advantageously utilized in the preparation of quick setting mortars, conventional concreates, such as reinforced concrete, road concretes, prefabrication concretes, pre-stressed concretes, cement injection grouts and all other similar materials containing portland cement or other cements having a high content of tricalcium silicate. The present composition is especially valuable for use in reinforced and pre-stressed concretes as a consequence of its marked anti-corrosive characteristics.

While the invention has been described and pointed out with reference to certain preferred embodiments thereof, those skilled in the art will appreciate that various changes and modifications and substitutions can be made without departing from the spirit of the invention. It is intended, therefore, that the invention be limited only by the scope of the claims which follow.

What is claimed is:
1. A composition of matter for improving portland cements and analogous cements, and mortars, concretes, and grouts in which said cements are incorporated, which composition comprises by weight with respect to said cements, between about 0.5% and 5% of an alkali metal acid carbonate, between about 0.05% and 2% of a hydroxylated organic acid alkali metal salt and between about 0.5% and 5% of an alkali metal silicate.

2. The composition as defined by claim 1 wherein said alkali metal silicate has a molar ratio of $SiO_2/M_2O$ between about 0.5 and 4, M being an alkali metal selected from the group consisting of sodium and potassium.

3. The composition as defined by claim 2 wherein said alkali metal silicate has a molar ratio of $SiO_2/M_2O$ between about 0.8 and 2.

4. The composition as defined by claim 1 wherein said hydroxylated organic acid alkali metal salt is selected from the group consisting of the alkali metal salt of tartaric, gluconic, lactic, malic and salicylic acid.

5. The composition as defined by claim 1 wherein said cements are characterized by a high content of tricalcium silicate.

6. A process for the preparation of improved portland cements and analogous cements, and mortars, concretes, and grouts derived from said cements which comprises adding thereto the composition as defined by claim 1.

7. The process as defined by claim 6 wherein said composition is added in the form of an intimately admixed powder.

8. Portland cements and analogous cements and mortars, concretes, and grouts derived from said cements and containing the composition as defined by claim 1.

References Cited
UNITED STATES PATENTS

| 2,174,051 | 9/1939 | Winkler | 106—90 |
| 2,522,707 | 9/1950 | Faber et al. | 106—90 |
| 2,880,102 | 3/1959 | Woodard et al. | 106—90 |
| 3,689,294 | 9/1972 | Braunauer | 106—90 |

DELBERT E. GANTZ, Primary Examiner

J. W. HELLWEGE, Assistant Examiner

U.S. Cl. X.R.
106—95, 314, 315